(No Model.)
M. BAUER.
GROUND GLASS ATTACHMENT FOR CAMERAS.
No. 503,518. Patented Aug. 15, 1893.
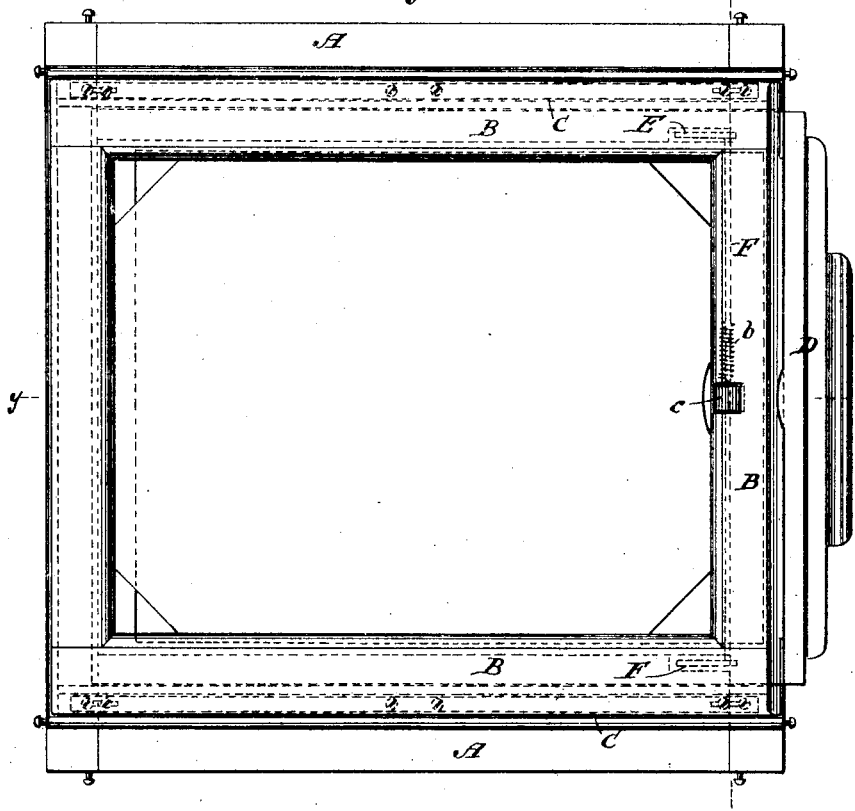
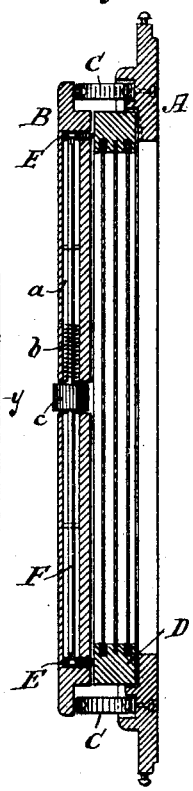
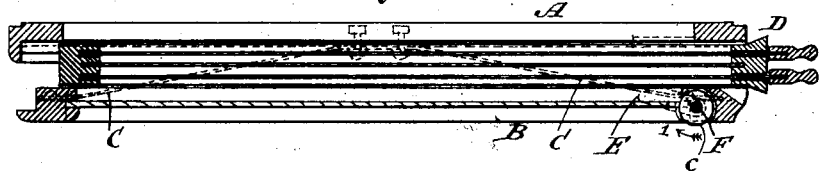
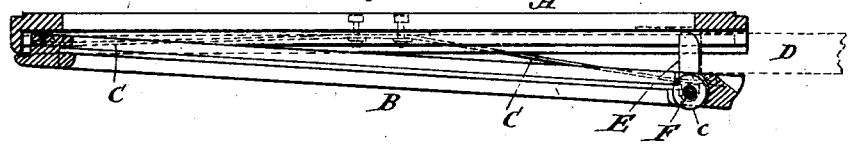
WITNESSES:
Edward Wolff
Chas. E. Poosgen
INVENTOR:
Max Bauer.
BY
Hauff & Hauff
ATTORNEYS.

UNITED STATES PATENT OFFICE.

MAX BAUER, OF GREENVILLE, NEW JERSEY.

GROUND-GLASS ATTACHMENT FOR CAMERAS.

SPECIFICATION forming part of Letters Patent No. 503,518, dated August 15, 1893.

Application filed April 27, 1893. Serial No. 472,072. (No model.)

*To all whom it may concern:*

Be it known that I, MAX BAUER, a citizen of the United States, residing at Greenville, in the county of Hudson and State of New Jersey, have invented new and useful Improvements in Ground-Glass Attachments for Cameras, of which the following is a specification.

The object of this invention is to provide a new and improved attachment for holding ground glass to the back of a camera, at the same time serving to hold the plate holder in place.

The invention consists in the combination with a back frame, a ground glass frame, and spring connections between the frames, of a spring actuated arbor mounted in the ground glass frame, toes mounted on this arbor, and a finger piece for turning the arbor against the action of its spring.

In the accompanying drawings Figure 1 represents a face view of my ground glass attachment. Fig. 2 is a transverse vertical section in the plane $x$ $x$ Fig. 1. Fig. 3 is a horizontal section in the plane $y$ $y$ Fig. 1 showing the plate holder in position between the back frame and the ground glass frame. Fig. 4 is a similar section showing the back frame and the ground glass frame in position for the introduction of the plate holder.

In the drawings the letter A designates the back frame and B is the ground glass frame. These two frames are connected by springs C which have a tendency to draw the ground glass frame close up against the inside of the back frame. These springs may be connected at their ends to the ground glass frame B and at the middle of their length to the back frame A or they may be attached to said frames in any other desirable manner which will produce the required effect.

D is the plate holder and in order to introduce this plate holder between the back frame A and the ground glass frame B, it is necessary to force the ground glass frame away from the back frame against the action of the spring connections and to hold it in this position until the plate holder is inserted. In order to facilitate this operation I have provided toes E which when the ground glass frame is forced back to the position shown in Fig. 4, can be moved inward so as to form braces, whereby the two frames are retained in the position shown in Fig. 4. If the plate holder D which is shown in dotted lines in Fig. 4, is pushed inward, the toes E are turned down to the position shown in Fig. 3, and the plate holder can be forced in between the two frames A B so as to occupy the position shown in Figs. 1, 2 and 3. In the example illustrated by the drawings the toes E are mounted on the ends of an arbor F which is situated in a cavity $a$ in the ground glass frame B (best seen in Fig. 2) and which is subjected to the action of a spring $b$ which has a tendency to turn the arbor F in the direction of arrow 1, (Fig. 3) so that when the end of the ground glass frame is forced back to the position shown in Fig. 4, the spring $e$ will throw the toes E into the position shown in this figure and the ground glass frame is retained in the proper position for the introduction of the plate holder as already described. On the arbor F is firmly secured a finger piece $c$ by means of which said arbor can be turned against the action of its spring $b$.

What I claim as new, and desire to secure by Letters Patent, is—

In a ground glass attachment for cameras, the combination with the back frame, the ground glass frame and spring connections between said frames, of a spring actuated arbor mounted in the ground glass frame, toes mounted on this arbor, and a finger piece for turning said arbor against the action of its spring, substantially as described.

In testimony whereof I have hereunto set my hand in the presence of two subscribing witnesses.

MAX BAUER.

Witnesses:
WM. C. HAUFF,
E. F. KASTENHUBER.